United States Patent Office 3,816,452
Patented June 11, 1974

3,816,452
ORGANOPHOSPHORUS COMPOUNDS CONTAINING N-BONDED PYRROLE GROUPS
Joseph J. Mrowca, Wilmington, Del., assignor to E. I. du Pont de Nemours and Company, Wilmington, Del.
No Drawing. Filed Jan. 25, 1972, Ser. No. 220,705
Int. Cl. C07d 27/20
U.S. Cl. 260—326.61      30 Claims

ABSTRACT OF THE DISCLOSURE

Disclosed herein are compounds of the formula

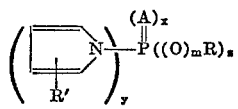

wherein:
A=O or S
R'=H or lower alkyl
R=substituted or unsubstituted hydrocarbyl groups of up to 12 carbons
x=0, 1
m=0, 1
y=1, 2
z=1, 2
y+z=3;

and a process therefor comprising reacting an alkali metal pyrrole with the appropriate halophosphorus reactant and, when x=1, reacting an oxygen or sulfur oxidant with the product of said reaction.

BACKGROUND OF THE INVENTION

(1) Field of the invention

This invention relates to organophosphorus compounds containing N-bonded pyrrole groups.

(2) Description of the prior art

Although a number of different types of nitrogen-bonded phosphorus compounds are known, those containing a pyrrole group bonded to phosphorus described by this invention are new. In the known nitrogen-bonded phosphorus compounds, the nitrogen-containing moiety is other than pyrrole. For example, it is known that such aromatic and alicyclic amines as tetrahydroquinoline and piperidine give N-substituted phosphines with $PCl_3$ and with dichlorophenylphosphine [Michaelies, Chem. Ber. 31, 1037 (1898); Ann., 326, 129 (1903); Michaelies et al., Chem. Ber., 31, 1042 (1898)]. Likewise, indole anion is known to give N-substituted products with $POCl_3$ and with $PCl_3$ [Mingoia, Gazz. Chim. Ital., 60, 144 (1930); ibid., 62, 333 (1932)].

When the nitrogen-containing moiety is pyrrole, the art teaches that the bond between said moiety and a phosphorus-containing moiety will be a carbon-phosphorus bond. That the pyrrole anion gives carbon-phosphorus bonds was found by Mingoia, ibid., 62, 333 (1932); Issleib et al., Z. Anorg. Allg. Chem., 292, 245 (1957); and Griffin et al., J. Org. Chem., 30, 91 (1965).

On the basis of the art it is unexepcted that the reaction products of pyrrole anion with the disclosed trivalent organophosphorus compounds would have N-bonded pyrrole groups The novel products disclosed herein are further distinguished from the C-bonded products of the art by their lack of reactivity associated with an N—H bond. For example, they do not form a potassium or magnesium bromide derivative as do pyrroles with hydrogen attached to nitrogen.

SUMMARY OF THE INVENTION

This invention concerns novel compounds of the formula

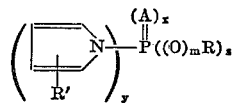

wherein:
A=O or S
R'=H or lower alkyl
R=hydrocarbyl of up to 12 carbons; or aliphatic hydrocarbyl of up to 12 carbons substituted with fluorine, $CF_3$ or OR", where R" is aryl of up to 10 carbons or lower alkyl; or aromatic hydrocarbyl of up to 12 carbons substituted with halogen, $CF_3$ or OR"; and where the R groups can form a hydrocarbyl diradical when z is 2
x=0, 1
m=0, 1
y=1, 2
z=1, 2 and Contemplated diradicals formed from the R groups in the generic formula (where z is 2) include but are not limited to the following:

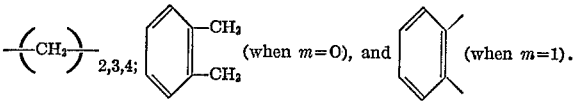

Preferred compounds of this invention are those in which R is alkyl, alkenyl, aryl, alkaryl, and aralkyl, including substituted alkyl, alkenyl and aryl. It is also preferred that when z=2, the two R groups be in the form of a diradical.

Especially preferred compounds are those in which R is alkyl and alkyl substituted with OR", aryl and aryl substituted with $CH_3$ or F, and R' is H.

The substituents on the R groups, as will be appreciated, should be nonreactive with the alkali metal pyrrole compounds. Those skilled in the art will understand that there are other substituents than those specifically noted herein which will not react with the pyrrole compounds. All of such substituents are within the scope of this invention.

By "hydrocarbyl" is meant a radical derived from a hydrocarbon by removal of a hydrogen atom. The radical can be saturated or it can contain olefinic or acetylenic unsaturation provided that the acetylenic unsaturation is not due to terminal acetylenic bonds. The term "hydrocarbyl" includes aryl groups, alkaryl groups, aralkyl groups, cycloaliphatic groups, alkyl groups, alkenyl groups and non-terminal alkynyl groups. The term "lower alkyl" means alkyl groups having up to 6 carbon atoms.

Process.—This invention also concerns the process for making the novel compounds, where x=0, comprising reacting an alkali metal pyrrole reactant with the appropriate halophosphorous reactant according to the reaction.

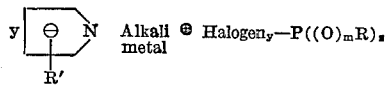

wherein R, R', m, y and z are as defined above and wherein the halogen is preferably chlorine or bromine and the alkali metal is preferably potassium.

The novel compounds wherein x=1 and wherein there is an oxygen or sulfur atom doubly bonded to the phosphorus are made by reacting the trivalent phosphorus compounds (made, in sequence, as described above) with an oxidant selected from the group consisting of oxygen-containing oxidants and sulfur-containing oxidants. Reaction of the pyrrole with the halophosphorus reactant is followed by reaction of the trivalent phosphorus reaction product with an oxidant as described.

DETAILS OF THE INVENTION

Various specific compounds representative of all the products within the scope of this invention are shown below in Column III. The compounds are made according to the process herein described by reacting the alkali metal pyrrole of Column I with the halophosphorus reactant of Column II.

| Column I | Column II | Column III |
|---|---|---|
| ⊖N K⊕ (ring) | Cl₂P—C₆H₄—OC₆H₅ | (ring-N)₂—P—C₆H₄—OC₆H₅ |
| Same as above | Cl₂PC₈H₁₅ | (ring-N)₂—PC₈H₁₅ |
| Do | Cl₂PCH=CHC₃H₇ | (ring-N)₂—PCH=CHC₃H₇ |
| Do | Cl₂POCH₂CH=CH₂ | (ring-N)₂—POCH₂CH=CH₂ |
| Do | ClP(CH=CH₂)₂ | ring-N—P(CH=CH₂)₂ |
| Do | ClP(CH₂CH=CH₂)₂ | ring-N—P(CH₂CH=CH₂)₂ |
| Do | ClP(CH₂-C₆H₄-CH₂) cyclic | ring-N—P(CH₂-C₆H₄-CH₂) cyclic |
| Do | ClP(OC₆H₅)₂ | ring-N—P(OC₆H₅)₂ |
| Do | ClP(C₆H₅)₂ | ring-N—P(C₆H₅)₂ |
| Do | ClP(O-CH₂-CH₂-O) cyclic | ring-N—P(O-CH₂-CH₂-O) cyclic |
| Do | ClP(OCH₂CH₃)₂ | ring-N—P(OCH₂CH₃)₂ |
| Do | Cl₂PC₆H₅ | (ring-N)₂—PC₆H₅ |
| Do | ClP(O—C₆H₄—CH₃)₂ | ring-N—P(O—C₆H₄—CH₃)₂ |
| Do | ClP(O—C₆H₄—F)₂ | ring-N—P(O—C₆H₄—F)₂ |
| Do | ClP—(C₆H₄-cyclopropyl)₂ | ring-N—P(C₆H₄-cyclopropyl)₂ |
| CH(CH₃)₂ ⊖N K⊕ (ring) | ClP—C₆H₅, CH₃ | CH(CH₃)₂ ring-N—P—C₆H₅, CH₃ |
| ⊖N K⊕ (ring) | Cl₂P—C₆H₄—Br | (ring-N)₂—P—C₆H₄—Br |
| Same as above | ClP(CH₂C≡CCH₃)₂ | ring-N—P(CH₂C≡CCH₃)₂ |
| Do | ClP—C₆H₄—OCH₃, C₆H₅ | ring-N—P—C₆H₄—OCH₃, C₆H₅ |
| Do | ClP(CH₂CH₃)₂ | ring-N—P(CH₂CH₃)₂ |

The corresponding phosphine oxides and phosphine sulfides ($x=1$, $A=O$ or $S$) are readily prepared from the trivalent phosphorus compounds of Column III by reaction with an oxygen oxidant or a sulfur-containing oxidant, respectively. Preferred oxidant reagents include hydrogen peroxide, oxygen, air, nitric acid, mercuric oxide and chromic acid for preparing compounds where $A=O$, and elemental sulfur for preparing compounds where $A=S$. In each case, when a trivalent phosphine in Column III is so treated, the corresponding phosphine oxide or phosphine sulfide is obtained. For the purposes of this invention, as will be understood by those skilled in the art, phosphine oxides are chemically equivalent to the corresponding phosphine sulfides.

Rather than depict all the pentavalent phosphine oxides and sulfides corresponding to the trivalent phosphines of Column III above, for the sake of brevity, only several will be specifically set out (although all are meant to be included):

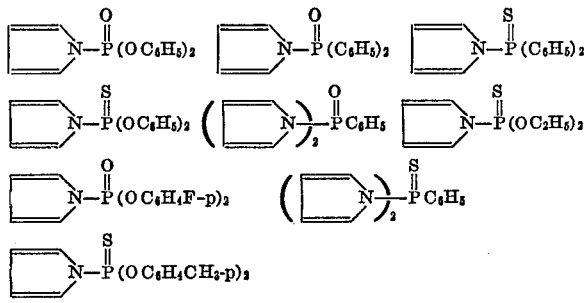

Process parameters.—In the reaction between a pyrrole anion and a chloro- or bromophosphorus compound, the potassium derivative of the pyrrole is a preferred alkali metal derivative to use. However, other alkali metal compounds may be used, including pyrryllithium and pyrrylsodium reactants.

The use of the isolted metal-pyrryl derivative is not necessary in that it may be formed *in situ* by the following types of reactions. Subsequent reaction of the solution of the metal-pyrryl derivative with a chloro- or bromophosphorus compound leads to the desired N-bonded phosphorus compound.

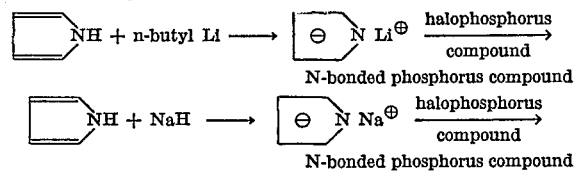

Normally, reaction between alkali metal pyrrole derivatives and halophosphorus compounds is carried out in an ether-type solvent. Examples of such solvents include diethyl ether, diisopropyl ether, di-n-butyl ether, di-n-amyl ether, tetrahydrofuran, dioxane, 2-methoxyethyl ether (diglyme) and 1,2-dimethoxyethane (glyme).

Reaction temperatures used in the preparation of the trivalent phosphorus compounds normally range from —20° C. to +50° C. with the preferred temperature range from 0 to 25° C. The reaction pressure is in the range of 0.5 to 1.5 atmospheres, but the reaction is most conveniently carried out near atmospheric pressure.

DESCRIPTION OF THE PREFERRED EMBODIMENTS

The following examples are meant to illustrate but not to limit the invention. NMR spectra were obtained in deuterated chloroform solution with tetramethylsilane as internal standard. Nitrogen-phosphorus bonding was established by infrared and proton NMR data. The infrared spectra of the products are devoid of $v_{N-H}$ vibrations in the 3400 cm.$^{-1}$ region characteristic of pyrrole N—H bonds [C. E. Griffin, R. P. Peller, and J. A. Peters, J. Org. Chem., 30, 91 (1965)]. The proton NMR spectra give integrations, 10:2:2 or 12:2, that are consistent only with nitrogen-bonded products.

EXAMPLE 1

Diphenoxy(1-pyrryl)phosphine

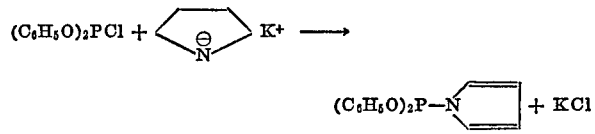

A solution of 50 g. of diphenylphosphorochloridite in 200 ml. of ether was added dropwise to a stirred, ice-cooled mixture of 22 g. of pyrrylpotassium in 500 ml. of ether under nitrogen. The mixture was stirred for 3 days, filtered, and the filtrate was evaporated under vacuum. The residue was distilled through a spinning band column to give 24 g. of diphenoxy(1-pyrryl)phosphine as a clear liquid, B.P. 120–123° C. at 0.1 mm.

*Anal.* Calcd. for $C_{16}H_{14}NO_2P$: C, 67.83; H, 4.98; P, 10.93. Found: C, 67.48; H, 4.90; P. 10.90.

NMR: τ 2.5–3.2 m (12 H) aromatic —H̲ and NCH̲, τ 3.64 t (2 H) NCH=CH̲.

IR (neat): No $v_{N-H}$ in spectrum.

EXAMPLE 2

Diphenyl(1-pyrryl)phosphine

A solution of 50 g. of chlorodiphenylphosphine in 200 ml. of ether was added dropwise to a stirred, ice-cooled supension of 25 g. of pyrrylpotassium in 500 ml. of ether under nitrogen. The mixture was stirred for 18 hours, filtered, and the filtrate was evaporated under aspirator vacuum. The residue was distilled through a spinning band column to give 32.5 g. of diphenyl(1-pyrryl)phosphine as a clear liquid, B.P. 120–123° C. at 0.1 mm.

*Anal.* Calcd. for $C_{16}H_{14}NP$: C, 76.48; H, 5.61; N, 5.57; P, 12.32. Found: C, 76.25; H, 5.54; N, 5.29; P, 11.83.

NMR: τ 2.5–3.0 m (10 H) aromatic —H̲, τ 3.16 m (2 H) NCH̲, τ 3.68 t (2 H) NCH=CH̲.

IR (neat): No $v_{N-H}$ observed.

EXAMPLE 3

Diphenyl(1-pyrryl)phosphine oxide

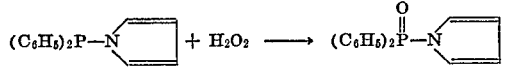

To a stirred, ice-cooled solution of 10 g. of diphenyl(1-pyrryl)phosphine in 100 ml. of acetone was added dropwise 4.8 g. of 30% hydrogen peroxide. The mixture was stirred overnight, evaporated under vacuum, and the residue was recrystallized from 400 ml. of cyclohexane to give 8.1 g. of diphenyl(1-pyrryl)phosphine oxide as white crystals, M.P. 120–121° C.

*Anal.* Calcd. for $C_{16}H_{14}NOP$: C, 71.90; H, 5.28. Found: C, 72.04; H, 5.30.

NMR: τ 2.5 m (10 H) aromatic —H̲, τ 3.12 m (2 H) NCH̲, τ 3.4 t (2 H) NCH=H̲.

IR (Nujol): No $v_{N-H}$ observed, $v_{P=O}$=1220 cm.$^{-1}$.

EXAMPLE 4

2-(1-pyrryl)-1,3,2-dioxaphospholane

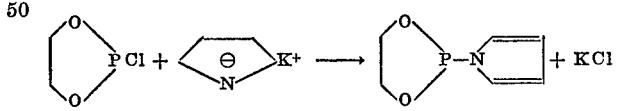

Ethylenephosphorochloridite (50 g.) was added dropwise to a stirred suspension of 41.5 g. of pyrrylpotassium in 400 ml. of ether under nitrogen. The mixture was stirred for 18 hours, filtered, and the filtrate was evaporated under aspirator vacuum. The residue was distilled through a spinning band column to give 41.2 g. of 2-(1-pyrryl)-1,3,2-dioxaphospholane as a clear liquid; B.P. 88–90° C. at 5 mm.

*Anal.* Calcd. for $C_6H_8NO_2P$: C, 45.89; H, 5.09; P, 19.73; N, 8.91. Found: C, 45.70; H, 512; P, 19.16; N, 9.06.

NMR: τ 3.12 m (2 H) NCH̲, τ 3.68 t (2 H) NCH=CH̲, τ 5.8 m (4 H) CH̲$_2$.

IR (neat): No $v_{N-H}$ in spectrum.

EXAMPLE 5

Diphenyl(1-pyrryl)phosphine sulfide

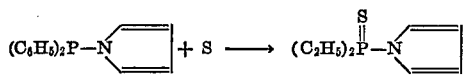

A mixture of 0.65 g. of sulfur, 5.0 g. of diphenyl (1-pyrryl)phosphine, and 30 ml. of benzene was refluxed under nitrogen for 1 hour and then stirred at room temperature for 1 day. The resulting clear, colorless solution was evaporated under vacuum, and the residue was recrystallized from 75 ml. of cyclohexane to give 3.65 g. of diphenyl(1-pyrryl)phosphine sulfide as white crystals, M.P. 108–110° C.

*Anal.* Calcd. for $C_{16}H_{14}NPS$: C, 67.82; H, 4.98; N, 4.94; P, 10.94. Found: C, 67.41; H, 4.99; N, 4.74; P, 10.70.

NMR: $\tau$ 2.5 m (10 H) phenyl —$\underline{H}$, $\tau$ 3.01 m (2 H) NC$\underline{H}$, $\tau$ 3.58 m (2 H) NCH=C$\underline{H}$.

IR (KBr): No $v_{N-H}$ in spectrum.

EXAMPLE 6

Diethoxy(1-pyrryl)phosphine

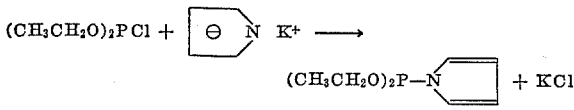

A solution of 65 g. of diethylphosphorochloridite in 250 ml. of ether was added dropwise to a stirred, ice-cooled suspension of 50 g. of pyrrylpotassium in 500 ml. of ether under nitrogen. The mixture was stirred overnight, filtered, and the filtrate was evaporated under vacuum. The residue was distilled to give 60 g. of diethoxy-(1-pyrryl)phosphine as a clear liquid, B.P. 38–42° C. at 0.1 mm.

*Anal.* Calcd. for $C_8H_{14}NO_2P$: C, 51.33; H, 7.53; N, 7.48; P, 16.56. Found: C, 51.09; H, 7.29; N, 7.17; P, 16.06.

NMR: $\tau$ 2.95 m (2 H) NC$\underline{H}$, $\tau$ 3.67 t (2 H) NCH=C$\underline{H}$, $\tau$ 6.13 m (4 H) OC$\underline{H}_2$, $\tau$ 8.77 t (6 H) C$\underline{H}_3$.

IR (neat): No $v_{N-H}$ in spectrum.

EXAMPLE 7

Phenyldi(1-pyrryl)phosphine

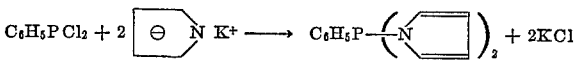

A solution of 50 g. of dichlorophenylphosphine in 200 ml. of ether was added dropwise to a stirred, ice-cooled suspension of 70 g. of pyrrylpotassium in 500 ml. of ether under nitrogen. The mixture was stirred overnight, filtered, and the filtrate was evaporated under vacuum to give 52 g. of phenyldi(1-pyrryl)phosphine as a white solid, M.P. 45–51° C.

*Anal.* Calcd. for $C_{14}H_{13}N_2P$: C, 69.98; H, 5.45; N, 11.66; P, 12.91. Found: C, 69.63; H, 5.50; N, 11.26; P, 12.30.

NMR: $\tau$ 2.5–3.2 m (9 H) phenyl —$\underline{H}$ and NC$\underline{H}$, $\tau$ 3.65 t (4 H) NCH=C$\underline{H}$.

IR (Nujol): No $v_{N-H}$ in spectrum.

EXAMPLE 8

Phenyldi(1-pyrryl)phosphine oxide

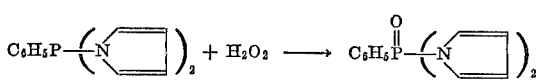

To a stirred, ice-cooled solution of 5 g. of phenyl-di(1-pyrryl)phosphine in 50 ml. of acetone was added dropwise 2.7 g. of 30% hydrogen peroxide solution. The mixture was then stirred for 1 hour at room temperature and filtered. The filtrate was evaporated under vacuum, and the residue was recrystallized from 150 ml. of cyclohexane to give 2.6 g. of phenyldi(1-pyrryl)phosphine oxide as white crystals, M.P. 93–95° C.

*Anal.* Calcd. for $C_{14}H_{13}N_2OP$: C, 65.61; H, 5.11; N, 10.93; P, 12.10. Found: C, 65.51; H, 5.07; N, 10.59; P, 11.72.

NMR: $\tau$ 2.5 m (5 H) phenyl —$\underline{H}$, $\tau$ 3.14 m (4 H) NC$\underline{H}$, $\tau$ 3.58 m (4 H) NCH=C$\underline{H}$.

IR (KBr): No $v_{N-H}$ in spectrum.

EXAMPLE 9

Diethoxy(1-pyrryl)phosphine sulfide

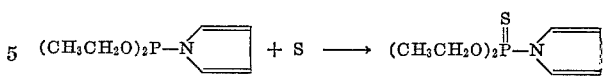

A mixture of 1.75 g. of sulfur, 10 g. of diethoxy(1-pyrryl)phosphine, and 100 ml. of benzene was refluxed under nitrogen for 4.5 hours. Volatiles were removed from the clear, colorless solution under vacuum, and the residue was distilled to give 10.12 g. of diethoxy(1-pyrryl) phosphine sulfide as a colorless liquid, B.P. 60–63° C. at 0.05 mm.

*Anal.* Calcd. for $C_8H_{14}NO_2PS$: C, 43.82; 6.43; N, 6.38. Found: C, 44.09; H, 6.30; N, 6.10.

NMR: $\tau$ 2.83 m (2 H) NC$\underline{H}$, $\tau$ 3.65 m (2 H) NCH=C$\underline{H}$, $\tau$ 5.86 m (4 H) C$\underline{H}_2$, $\tau$ 8.70 t (6 H) C$\underline{H}_3$.

IR (neat): No $v_{N-H}$ in spectrum.

EXAMPLE 10

1-pyrryldi(*p*-methylphenoxy)phosphine

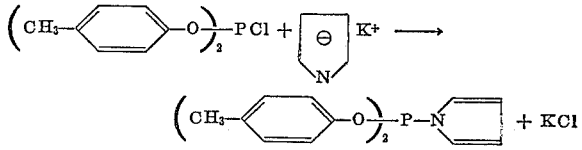

A solution of 50 g. of chlorodi(*p*-methylphenoxy)phosphine in 200 ml. of ether was added dropwise to a stirred, ice-cooled suspension of 21 g. of pyrrylpotassium in 300 ml. of ether under nitrogen. The mixture was stirred at room temperature overnight, filtered, and the filtrate was evaporated under vacuum. The residue was distilled through a spinning band column to give 41 g. of 1-pyrryldi(*p*-methylphenoxy)phosphine as a clear liquid, B.P. 137–140° C. at 0.05 mm.

*Anal.* Calcd. for $C_{18}H_{18}NO_2P$: C, 69.44; H, 5.82. Found: C, 69.44; H, 5.84.

NMR: $\tau$ 3.0 m (10 H) phenyl —$\underline{H}$ and NC$\underline{H}$, $\tau$ 3.63 t (2 H) NCH=C$\underline{H}$, $\tau$ 7.73 s (6 H) C$\underline{H}_3$.

IR (neat): No $v_{N-H}$ in spectrum.

EXAMPLE 11

1-pyrryldi(*p*-fluorophenoxy)phosphine

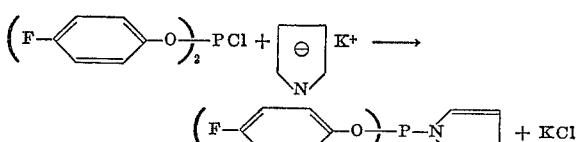

A solution of 32 g. of chlorodi(*p*-fluorophenoxy)phosphine in 150 ml. of ether was added dropwise to a stirred, ice-cooled suspension of 14 g. of pyrrylpotassium in 150 ml. of ether under nitrogen. The mixture was stirred overnight, filtered, and the filtrate was evaporated under aspirator vacuum. The residue was distilled through a spinning band column to give 24 g. of 1-pyrryldi(*p*-fluorophenoxy) phosphine as a clear, viscous liquid, B.P. 105–110° C. at 0.5 mm.

*Anal.* Calcd. for $C_{16}H_{12}F_2NO_2P$: C, 60.19; H, 3.78; N, 4.38. Found: C, 60.48; H, 3.96; N, 4.40.

NMR: $\tau$ 3.0 m (10 H) phenyl —$\underline{H}$ and NC$\underline{H}$, $\tau$ 3.60 t (2 H) NCH=C$\underline{H}$.

IR (neat): No $v_{N-H}$ in spectrum.

EXAMPLE 12

Diethyl(1-pyrryl)phosphine

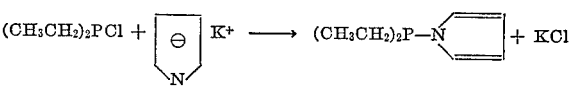

This reaction was run in a nitrogen box. To a stirred suspension of 10.0 g. of pyrrylpotassium in 150 ml. of ether was added dropwise 10.0 g. of diethylchlorophosphine. The mixture was stirred overnight, filtered, and the filtrate was evaporated under vacuum to give 11.2 g. of diethyl(1-pyrryl)phosphine.

*Anal.* Calcd. for $C_8H_{14}NP$: C, 61.92; H, 9.09; N, 9.03. Found: C, 61.87; H, 8.53; N, 8.32.

NMR: τ 2.85 m (2 H) NC$\underline{H}$, τ 3.73 m (2 H) NCH=C$\underline{H}$, τ 7.9–9.4 m (10 H) C$\underline{H}_3$C$\underline{H}_2$.

The product was purified by distillation to give 6.62 g. of product, B.P. 34° C. at 0.05 mm.

*Anal.* Calcd. for $C_8H_{14}NP$: C, 61.92; H, 9.09; N, 9.03. Found: C, 61.68; H, 9.14; N, 8.87.

Utility

The novel compounds of this invention are useful as flame retardants for both cotton fabrics and wood. The examples below describe the use of several of these materials in these applications. The manner and result of flame proofing as set out in Examples A to H are representative of the manner and result of employing any and all of the novel compounds disclosed herein.

EXAMPLES A–D

Flameproofing cotton

A 1-g. sample of diphenyl(1-pyrryl)phosphine (Example 2) was dissolved in 4 ml. of dimethylformamide and a strip of cotton cloth was soaked in the solution for 15 minutes. The cloth was removed and allowed to air-dry overnight. When a flame was applied to the cloth and then removed, the cloth was self-extinguishing. An untreated sample of the cloth continued to burn vigorously, even after the flame was removed. The organophosphorus compounds with N-bonded pyrrole groups described in Examples 7, 8 and 9 were tested in a similar manner and in each case the treated cotton became self-extinguishing.

EXAMPLES E–H

Flameproofing wood

In a similar way, a 1-g. sample of diphenyl(1-pyrryl)phosphine (Example 2) was dissolved in 4 ml. of dimethylformamide and a small wooden stick was immersed in the solution for 15 minutes. The stick was removed and allowed to dry overnight. When a flame was applied to the stick and then removed, the stick was self-extinguishing. An untreated stick continued to burn vigorously, even after removal of the flame. The organophosphorus compounds with N-bonded pyrrole groups described in Examples 7, 8 and 9 were tested in the same manner and in each case the treated wood became self-extinguishing.

The embodiments of the invention in which an exclusive property or privilege is claimed are defined as follows:

1. A compound of the formula $$\left[\begin{array}{c}\overset{(A)_x}{\underset{R'}{\square}} \\ N-P((O)_mR)_z \end{array}\right]_y$$

wherein:
A=O or S
R'=H or lower alkyl
R=unsubstituted hydrocarbyl of up to 12 carbons selected from the group consisting of alkyl, alkenyl, non-terminal alkynyl, aryl, alkylphenyl and phenylalkyl; alkyl of up to 12 carbons substituted with fluorine, $CF_3$ or OR", where R" is phenyl or lower alkyl; phenyl substituted with halogen, $CF_3$ or OR"; or, when z is 2, the R groups can form a hydrocarbyl diradical selected from the group consisting of $\{CH_2\}_w$ where w=2, 3 or 4,

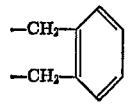

when m=0, and

when m=1
x=0, 1
m=0, 1
y=1, 2
z=1, 2 and
y+z=3.

2. A compound according to claim 1 wherein x=0.
3. A compound according to claim 2 wherein y=1.
4. A compound according to claim 3 wherein m=0.
5. A compound according to claim 4 of the formula

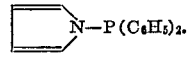

6. A compound according to claim 4 of the formula

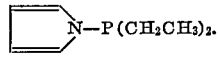

7. A compound according to claim 4 wherein R is a diradical.
8. A compound according to claim 3 wherein m=1.
9. A compound according to claim 8 of the formula

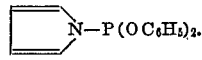

10. A compound according to claim 8 of the formula

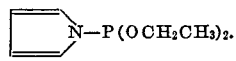

11. A compound according to claim 8 of the formula

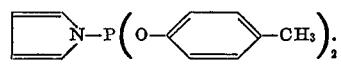

12. A compound according to claim 8 of the formula

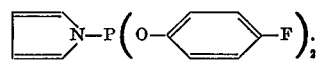

13. A compound according to claim 8 wherein R is a diradical.
14. A compound according to claim 13 of the formula

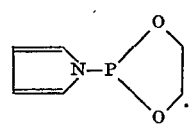

15. A compound according to claim 2 wherein y=2.
16. A compound according to claim 15 wherein m=1.
17. A compound according to claim 15 wherein m=0.
18. A compound according to claim 17 of the formula

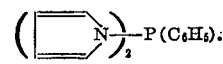

19. A compound according to claim 1 wherein x=1.
20. A compound according to claim 19 wherein y=1.
21. A compound according to claim 20 wherein m=0.
22. A compound according to claim 21 of the formula

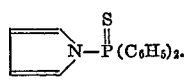

23. A compound according to claim 21 of the formula

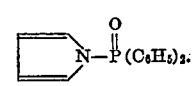

24. A compound according to claim 20 wherein m=1.
25. A compound according to claim 24 wherein R is a diradical.

26. A compound according to claim 24 of the formula
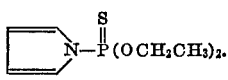
27. A compound according to claim 19 wherein $y=2$.
28. A compound according to claim 27 wherein $m=1$.
29. A compound according to claim 27 wherein $m=0$.
30. A compound according to claim 29 of the formula
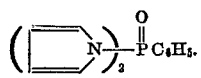
References Cited
UNITED STATES PATENTS
2,663,705   12/1953   Parker et al. _____ 260—239 X
3,450,713   6/1969   Tolkmith et al. _____ 260—326
JOSEPH A. NARCAVAGE, Primary Examiner
U.S. Cl. X.R.
252—8.1; 260—326.5 A